(12) United States Patent
Miyazaki et al.

(10) Patent No.: US 6,581,488 B2
(45) Date of Patent: Jun. 24, 2003

(54) CONTROL DEVICE FOR AN ACTUATOR APPLIED IN A TRANSMISSION

(75) Inventors: Takeshige Miyazaki, Anjo (JP); Ryuji Choshi, Aichi-ken (JP); Yoshiyuki Aoyama, Nishio (JP); Mitsutoshi Kamiya, Kariya (JP); Yoshihiro Ichikawa, Gifu (JP)

(73) Assignee: Aisin AI Co., Ltd., Nishio (JP)

( * ) Notice: Subject to any disclaimer, the term of this patent is extended or adjusted under 35 U.S.C. 154(b) by 0 days.

(21) Appl. No.: 09/942,874

(22) Filed: Aug. 31, 2001

(65) Prior Publication Data

US 2002/0023510 A1 Feb. 28, 2002

(30) Foreign Application Priority Data

Aug. 31, 2000 (JP) ........................................ 2000-263706

(51) Int. Cl.$^7$ .............................................. F16H 63/00
(52) U.S. Cl. ........................... 74/335; 74/336 R; 74/337
(58) Field of Search .............................. 74/335, 473.12, 74/336 R, 337; 477/906, 164; 701/60, 62, 64; 192/84.6

(56) References Cited

U.S. PATENT DOCUMENTS

| | | | | |
|---|---|---|---|---|
| 3,793,898 A | * | 2/1974 | Espenschied et al. | ......... 74/335 |
| 4,766,774 A | * | 8/1988 | Tamai | ................. 74/473.12 |
| 4,856,360 A | * | 8/1989 | Yoshimura et al. | ........... 701/59 |
| 5,069,084 A | * | 12/1991 | Matsuno et al. | ............... 477/61 |
| 5,138,905 A | * | 8/1992 | Kouno | ....................... 477/124 |
| 5,167,311 A | * | 12/1992 | Satoh et al. | ................ 192/3.58 |
| 5,847,272 A | | 12/1998 | Schneider et al. | |
| 6,058,795 A | * | 5/2000 | Ottenbruch et al. | ........... 74/335 |
| 6,077,187 A | * | 6/2000 | Suzuki et al. | ................. 477/46 |
| 6,164,149 A | * | 12/2000 | Ohmori et al. | ............ 74/336 R |
| 6,230,576 B1 | * | 5/2001 | Yamada et al. | ............... 74/335 |
| 6,276,224 B1 | * | 8/2001 | Ueda et al. | .................... 74/335 |
| 6,286,381 B1 | * | 9/2001 | Reed et al. | ................ 74/336 R |
| 6,301,537 B1 | * | 10/2001 | Walker | ......................... 701/51 |
| 6,389,916 B1 | * | 5/2002 | Fukuda | ......................... 74/335 |
| 6,428,444 B1 | * | 8/2002 | Tabata | ....................... 180/65.3 |
| 6,480,797 B1 | * | 11/2002 | Fritz et al. | ................... 702/107 |

FOREIGN PATENT DOCUMENTS

| EP | 0 310 387 A2 | 4/1989 |
|---|---|---|
| EP | 0 448 219 A1 | 9/1991 |
| EP | 0 546 597 A1 | 6/1993 |
| EP | 0 599 511 A1 | 6/1994 |
| EP | 0 638 743 A1 | 2/1995 |
| EP | 0 976 955 A2 | 2/2000 |

\* cited by examiner

*Primary Examiner*—Charles A. Marmor
*Assistant Examiner*—David D. Le
(74) *Attorney, Agent, or Firm*—Burns, Doane, Swecker & Mathis, LLP (57) ABSTRACT

A control device for a actuator applied in a transmission includes a maximum electric current value detecting device that detects a maximum electric current value supplied to the actuator. The maximum electric current value detecting device includes a determining unit, an electric current supplying unit, a detecting unit, and a setting unit. The determining unit determines a target electric current value supplied to the actuator, the electric current supplying unit supplies electric current to the actuator on the basis of the target electric current value determined by the determining unit, the detecting unit detects the maximum electric current value actually supplied to the actuator independently of the target electric current value determined by the determining unit, and the setting unit sets the maximum electric current value supplied to the actuator on the basis of the maximum electric current value detected by the detecting unit.

21 Claims, 7 Drawing Sheets

CONTROL DEVICE FOR AN ACTUATOR APPLIED IN A TRANSMISSION

This application is based on and claims priority under 35 U.S.C. §119 with respect to Japanese Patent Application No. 2000-263706, filed on Aug. 31, 2000, the entire content of which is incorporated herein by reference.

FIELD OF THE INVENTION

This invention generally relates to a control device for controlling an actuator applied in a vehicle transmission.

BACKGROUND OF THE INVENTION

Vehicles such as passenger cars, buses, trucks and the like are generally driven by a driving power source such as, for example, an engine or an electric motor. Further, the vehicle includes a transmission and is applied with a driving speed and a driving force corresponding to a vehicle running condition. Known transmissions include an automatic transmission (AT), a continuously variable transmission (CVT), and a manual transmission (MT).

The known manual transmission is provided with a counter shaft (an input shaft), a main shaft (an output shaft), a plurality of counter gears mounted on the counter shaft, a plurality of idle gears mounted on the main shaft, and a synchromesh mechanism. The counter shaft is a transmitting member that transmits input rotation of the engine to the main shaft (the output shaft). The main shaft is a transmitting member for the output rotation of the transmission to a propeller shaft. The plurality of idle gears is idly rotated around the main shaft and is always engaged with the plurality of counter gears. The synchromesh mechanism includes synchronizer hubs that are mounted on the main shaft and are rotated integrally with the main shaft. The synchromesh mechanism further includes sleeves which mesh with splines defined in the outer surface of the synchronizer hub so that the sleeve is slidably movable in the axial direction of the main shaft. More specifically, the synchromesh mechanism selectively operates one of the sleeves to slidably move on the main shaft on the basis of a driver's intention. The spline-engagement between the sleeve (i.e. the main shaft) and the idle gear synchronize rotation of the selected sleeve (i.e. a rotation of the main shaft) with a desired rotation of the idle gear so that a desired speed-change is performed.

According to the known manual transmission, operation of the clutch by the driver is required to permit a shift operation by the driver to perform the desired speed-change. When a floor-mounted shift lever or a column shift lever is operated by the driver to perform the desired speed-change upon shift operation, a shift fork shaft and a shift fork are moved in response to the operation of the shift lever. The sleeve engaged with a tip end of the shift fork is slidably moved so as to perform the desired speed-change.

Somewhat recent developments have led to automatic manual transmissions which are structurally based on the manual transmission (MT). The automatic manual transmission performs an automatic shift operation based on the vehicle driving condition or a semiautomatic shift operation based on the driver's intention. Therefore, the automatic manual transmission effectively decreases the operating load or operating requirements of the driver. This type of automatic manual transmission requires an actuator as a substitute for the manual operation performed by the driver in case of the manual transmission. The actuator is activated by a driving power source such as hydraulic pressure, air pressure, or an electric motor. Whichever driving power source is used for the actuator, it is preferable that the actuator be adapted to effect a relatively complex, fine, and proper control in order to decrease shift shock.

For example, when the actuator is activated by hydraulic pressure, the amount of electric current supplied to a solenoid valve such as a linear solenoid valve needs to be relatively finely controlled. Further, the timing associated with the supply of electric current to the solenoid valve also needs to be relatively finely controlled so that the hydraulic pressure supplied to the actuator is properly controlled. On the other hand, when the actuator is activated by an electric motor such as a servo motor or a stepping motor, the amount of electric current supplied to the electric motor needs to be relatively finely controlled. Further, the timing associated with the supply of electric current to the electric motor also needs to be relatively finely controlled so that the timing of the actuator to be activated and the load applied to the actuator are properly controlled. The description that follows is based on an actuator that is activated by an electric motor.

The amount of electric current supplied to the electric motor is limited and varies depending on the vehicle environment or the vehicle driving condition. For instance, a maximum electric current value supplied to the electric motor varies depending on the temperature difference between the temperature immediately after an initial driving of the electric motor and the temperature after continued driving of the electric motor, the battery voltage accommodated in the vehicle, and the characteristics of the electric motor. The amount of electric current supplied to the electric motor may sometimes vary by approximately 30–50% depending on such factors. Therefore, it may not be possible to control the electric motor with the original design performance and so shift shock may occur.

Figure 5:
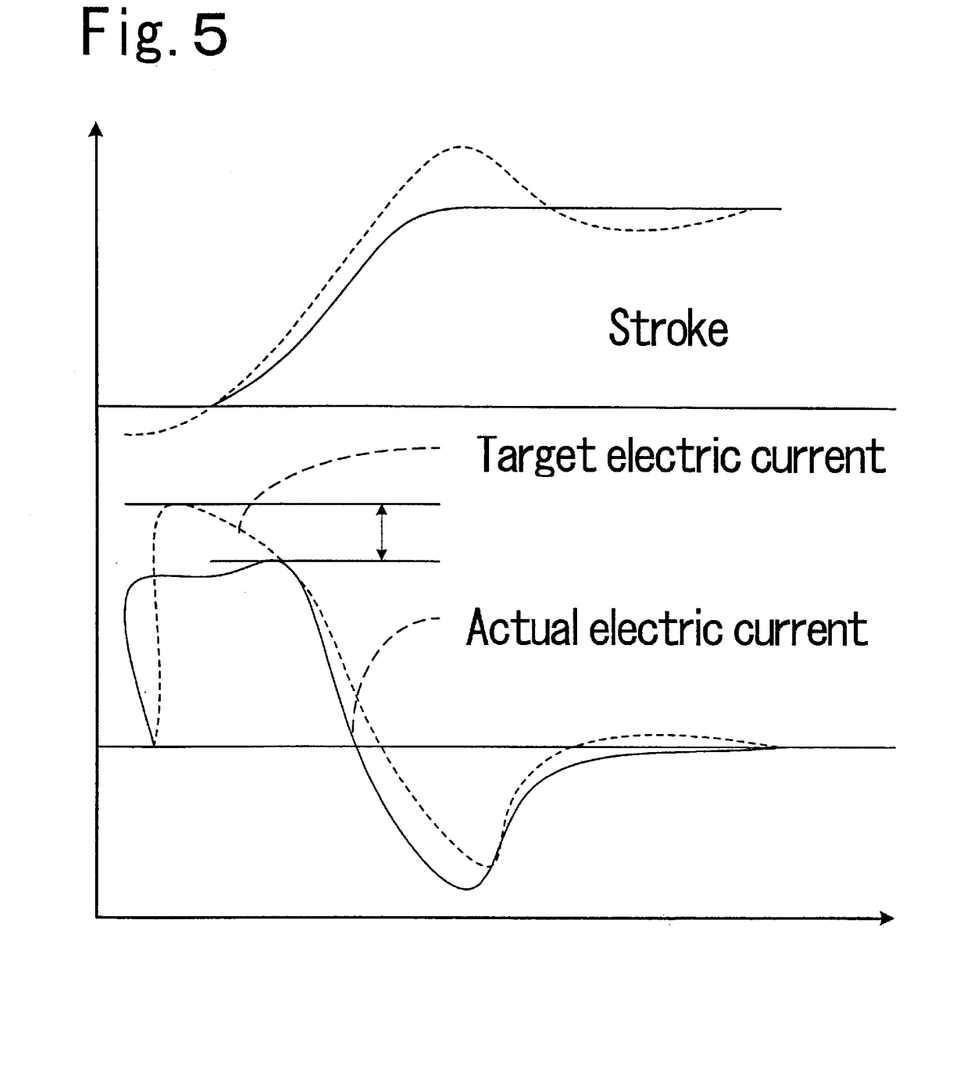
FIG. 5 is a graph illustrating an example of the performance characteristics associated with a known control device for an actuator showing that the actual electric current value does not correspond to the target electric current value.
Figure 6:
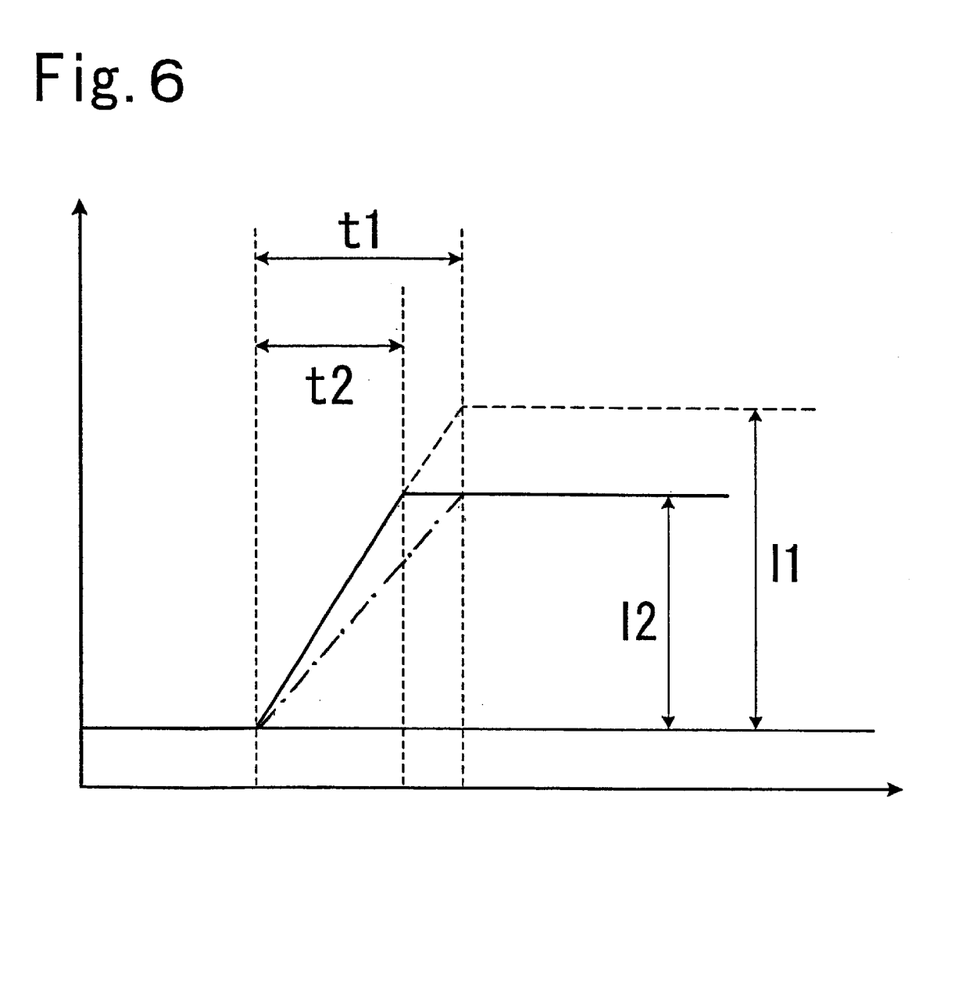
FIG. 6 is a graph illustrating another example of the performance characteristics associated with a known control device for an actuator showing that the actual electric current value does not correspond to the target electric current value.

More specifically, as shown in FIG. 5, because the maximum electric current value actually supplied to the DC motor is lower than a predetermined target electric current, a relatively large difference may exist between the target electric current value and an actual electric current value. Therefore, shift shock may occur due to an error with respect to the speed or timing of a shift stroke. As shown in FIG. 6, a proportional increase of the electric current up to a value I1 is expected to perform for the period t1 (depicted with a dashed line). However, because the maximum electric current value supplied to the DC motor is only I2, the proportional increase of the electric current to the value I1 is not performed. The proportional increase of the electric current up to the electric current value I2 is performed for the period t2. Further, the electric current value supplied to the DC motor after t2 is maintained at the value I2. Therefore, the operation of the actuator is unstable due to a surge load, wherein the shift shock may occur.

It is thus seen that known vehicle automatic manual transmissions are susceptible of certain improvements with respect to providing an improved control device that performs accurate control of the actuator driven by an electric current to reduce shift shock.

A need this exists for an improved control device for controlling an actuator applied in a transmission and activated by electric current supplied to a motor.

A need also exists for an improved control device which is adapted to detect a maximum electric current value actually supplied to the actuator and control the actuator on the basis of the detected maximum electric current value.

A need also exists for an improved control device which determines a target electric current value to be supplied to the actuator on the basis of a set maximum electric current value and avoids or decreases a difference between the target electric current value and the actually supplied electric current value to thereby perform a relatively stable operation of the actuator by decreasing the shift shock.

SUMMARY OF THE INVENTION

A control device for an actuator of a vehicle transmission includes a target electric current value determining mechanism for determining a target electric current value to be supplied to the actuator, an electric current supplying mechanism for supplying an electric current to the actuator based on the target electric current value, a maximum electric current value detecting mechanism for detecting a maximum electric current value actually supplied to the actuator regardless or independent of the target electric current value, and a maximum electric current value setting mechanism for setting the maximum electric current value based on the maximum electric current value detected by the maximum electric current value detecting mechanism.

The control device for the actuator can further include a malfunction indicating signal outputting mechanism that outputs a malfunction indicating signal when the maximum electric current value output by the maximum electric current value setting mechanism deviates from a predetermined allowable range. When the malfunction indicating signal is outputted by the outputting mechanism, the control mode can be changed to a fail-safe mode.

The actuator can be in the form of a DC motor and the control device for the actuator can also include a temperature detecting mechanism for detecting an ambient temperature of the DC motor. The maximum electric current value detected by the maximum electric current value detecting mechanism is based on the ambient temperature detected by the temperature detecting mechanism.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

A control device for an actuator applied to a vehicle transmission in accordance with the present invention includes a maximum electric current value detecting means, a transmission and an actuator. The operation of the maximum electric current value detecting means is designed to detect the maximum electric current value that is actually supplied to the actuator. The actuator is operated on the basis of the actually supplied electric current.

The maximum electric current value detecting means includes a determining unit, an electric current supplying unit, a detecting unit, and a setting unit. The determining unit determines a target electric current value that should be supplied to the actuator. In a known manner, the target electric current value is calculated on the basis of a target shift stroke and an actual shift stroke, with the target shift stroke being predetermined based on a driver's intention with respect to shift operation. By way of example, if the driver intends to change a first speed gear to a third speed gear, the target shift stroke is determined by the shift stroke from the first speed gear to the third speed gear by selecting the shift lever from the first speed gear position to the third speed gear position via the neutral position.

After the target electric current value is determined, the electric current supplying unit supplies electric current to the actuator on the basis of the target electric current value determined by the determining unit. The detecting unit detects the maximum electric current value actually supplied to the actuator independently of the target electric current value determined by the determining unit. The setting unit finally sets the maximum electric current value supplied to the actuator on the basis of the maximum electric current value detected by the detecting unit.

When the maximum electric current value is detected by the maximum electric current value detecting means, a predetermined electric current is supplied to the actuator in response to a signal from the determining unit to the electric current supplying unit in a control device. At the detecting unit, the maximum electric current value supplied to the actuator is detected until the electric current actually supplied to the actuator reaches a maximum level, independently of the target electric current value determined by the determining unit. At the setting unit, the maximum electric current value detected by the detecting unit is set as the maximum electric current value that can be supplied to the actuator. The setting unit includes an internal memory which is updated as needed or as a new maximum electric current value is detected. Every time a new maximum electric current value is detected, the data inputted in the internal memory is overwritten. The data which is being inputted into the internal memory is read by the control device as needed and the electric current value supplied to the actuator is controlled on the basis of the data inputted into the internal memory.

As mentioned above, electric current is supplied to the actuator based on the target electric current value determined by the determining unit. If the target electric current value is increased or decreased proportionally or curvilinearly with a constant sweep speed, the electric current is also supplied proportionally or curvilinearly based on the target electric current value. The sweep speed represents the electric current value change amount per unit of time. The maximum electric current value is determined when the supplied electric current is saturated. When the supplied electric current is proportionally or curvilinearly increased, the supplied electric current is equal to the target electric current value. However, when the supplied electric current reaches the upper threshold of the electric current, the supplied electric current is saturated. Therefore, a gap or difference exists between the supplied electric current and the target electric current (i.e., the maximum electric current is determined at this point). Thus, determining the target electric current value at a constant sweep speed helps to detect the maximum electric current value.

If the actuator is comprised of a DC motor, it is preferable that the maximum electric current value detecting means is adapted to detect the maximum electric current value while the DC motor is not being rotated or is not activated. While the DC motor is being rotated or is active, the electric current value supplied to the DC motor is decreased due to an induced electromotive force of the DC motor. Accordingly, to accurately detect the maximum electric current value actually supplied to the DC motor, it is preferable that the detection be performed when the DC motor is inactive.

Figure 4:
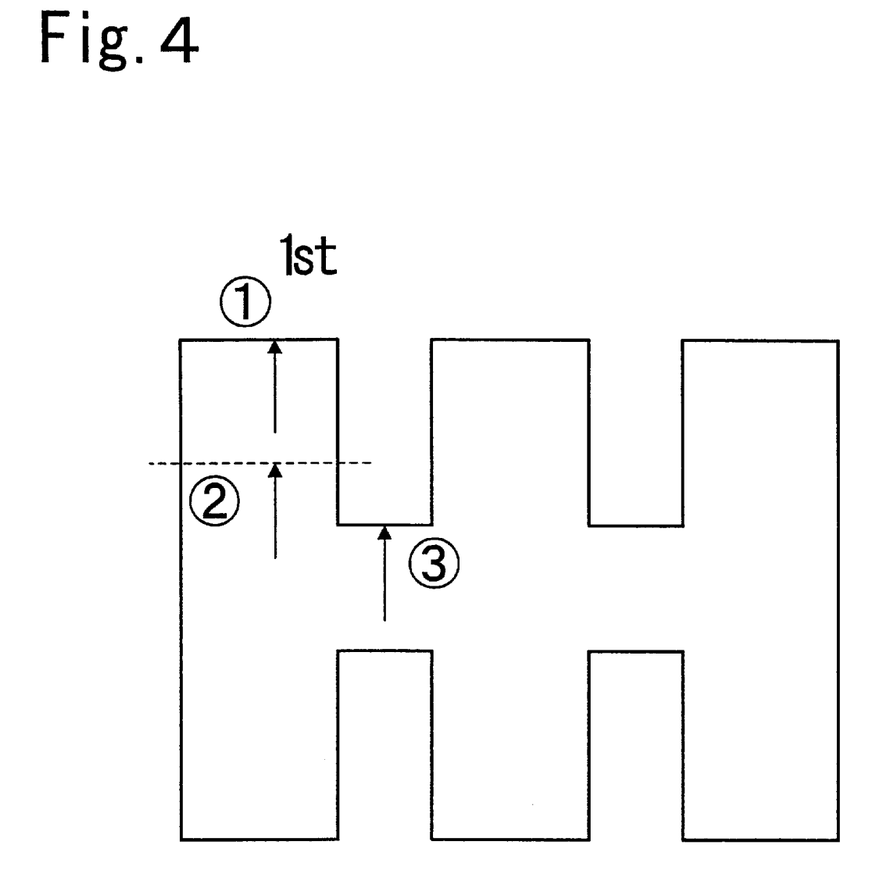
FIG. 4 is a schematic illustration of an optimal position of a shift lever to detect the maximum electric current value by the maximum electric current detecting device.

The rotation of the DC motor largely depends on the type of actuator or the characteristics of the actuator. An example is when the actuator is a shift actuator applied in a synchromesh-type transmission (described later). As shown in FIG. 4, the DC motor is not rotated under the following three positions: position (1) when a shift lever is in contact with a stopper and a speed-change (a first speed-change according to FIG. 4) has been performed; position (2) when the shift stroke speed is set to be approximately zero even during the shift operation and synchronizing is being performed by the synchromesh mechanism (a balk point); and position (3) when the shift lever is positioned at a neutral position and is not shifted. When the maximum electric current value is detected with the shift lever being positioned at the neutral position, an interlock mechanism is preferably disposed between each shift fork shaft to prevent a plurality of speed-change gears from meshing with each other.

The control device for controlling the actuator of a transmission according to the present invention further includes a temperature sensor for detecting, for example, an ambient temperature of the DC motor. The maximum electric current value is preferably detected on the basis of the ambient temperature of the DC motor detected by the temperature sensor. The maximum electric current value supplied to the actuator varies corresponding to the DC motor under the influence of the ambient temperature of the DC motor. Therefore, the control of the actuator is more properly performed if the maximum electric current value is detected in response to temperature variations with respect to the ambient temperature of the DC motor.

Alternatively, the ambient temperature of the DC motor can be estimated, for example, by the temperature of the oil in the transmission, the engine or the driving motor (driving power source 10), the temperature of the cooling fluid in the transmission, the engine or the driving motor (driving power source 10), or the temperature of the engine compartment.

The electric current supplied from the battery is substantially stable by virtue of an alternator. The maximum electric current value can vary, especially in response to the ambient temperature of the DC motor. Therefore, it is preferable that the oil temperature of the transmission is detected by a temperature sensor as a standard temperature for estimating the ambient temperature of the DC motor, and the maximum electric current value is detected on the basis of the detected oil temperature of the transmission. The temperature is not necessarily limited to being detected by a single temperature sensor. The maximum electric current value may be detected on the basis of the temperatures detected by a plurality of temperature sensors.

The temperature sensor used in the present invention may be comprised of a known temperature sensor already utilized in connection with the vehicle. That is, a temperature sensor used exclusively in connection with detecting the maximum electric current value, in addition to the known temperature sensor used for other purposes, is not required.

It is preferable that the detection of the maximum electric current value is performed every time the temperature varies by a predetermined range or amount. The more finely the maximum electric current value is detected, the more accurately the maximum electric current value is detected, thus facilitating proper performance of the actuator. However, the variation of the maximum electric current value at temperature variations of 5° C., 10° C. and 20° C. is not so different from the variation of the maximum electric current value at temperature variations of 1° C., 2° C. and 3° C. Therefore, the maximum electric current value can be properly detected at temperature variations of 5° C., 10° C. and 20° C. In this way, the maximum electric current value is properly detected with less operating load being applied to the control device.

It is also preferable that the maximum electric current value detecting means includes an output unit for outputting a malfunction indicating signal when the maximum electric current value detected by the detecting unit deviates from a predetermined allowable range, i.e. the maximum electric current value is an abnormal value. The electric current to be supplied to the actuator is determined roughly based on the entire control system for the actuator. When the maximum electric current value detected by the detecting unit deviates from the predetermined allowable range, it is regarded or assumed that the control system for the actuator has experienced a malfunction. If the control device for the actuator includes the output unit for outputting the malfunction indicating signal, the malfunction is detected at an early stage on the basis of the malfunction indicating signal from the output unit, wherein a preemptive action can be implemented. For example, a malfunction warning lamp can be provided and is lighted on the basis of the malfunction indicating signal. Alternatively, a control mode of the actuator can be switched to a fail-safe mode. When the maximum electric current value detected by the detecting unit deviates from the allowable range, the maximum electric current value is not required to be set by the setting unit. That is, the device can be designed so that the setting unit does not set the maximum electric current value when the maximum electric current value detected by the detecting unit deviates from the allowable range.

The transmission is not necessarily limited to the known manual transmission (MT) and the automatic manual transmission. Instead, this invention is applicable to other transmissions such as an automatic transmission (AT) and a continuously variable transmission (CVT) insofar as they are provided with or include an actuator which is electrically controlled. Although the description set forth above is based on the actuator made of a DC motor, the invention is also applicable to an actuator made of a solenoid valve for performing a hydraulic pressure control. The actuator is not limited to a shift actuator (described later), but is also applicable to other actuators such as a select actuator or a clutch actuator for controlling engagement and disengagement of a clutch.

The transmission is preferably a synchromesh-type transmission including an input shaft, an output shaft, an idle gear for transmitting rotation of the input shaft, a sleeve for transmitting the rotation to the output shaft, and a synchromesh mechanism. In response to movement of the sleeve, the sleeve meshes with the idle gear, wherein the synchromesh mechanism performs a predetermined speed-change. It is more preferable that the actuator be made of the shift actuator for moving the sleeve. However, when the input shaft is synchronized with the output shaft after the movement of the sleeve by the shift actuator, shift shock may occur. If an operating timing and driving torque of the shift actuator is controlled on the basis of the maximum electric current value, shift shock may be decreased or the occurrence of shift shock may be reduced.

Figure 1:
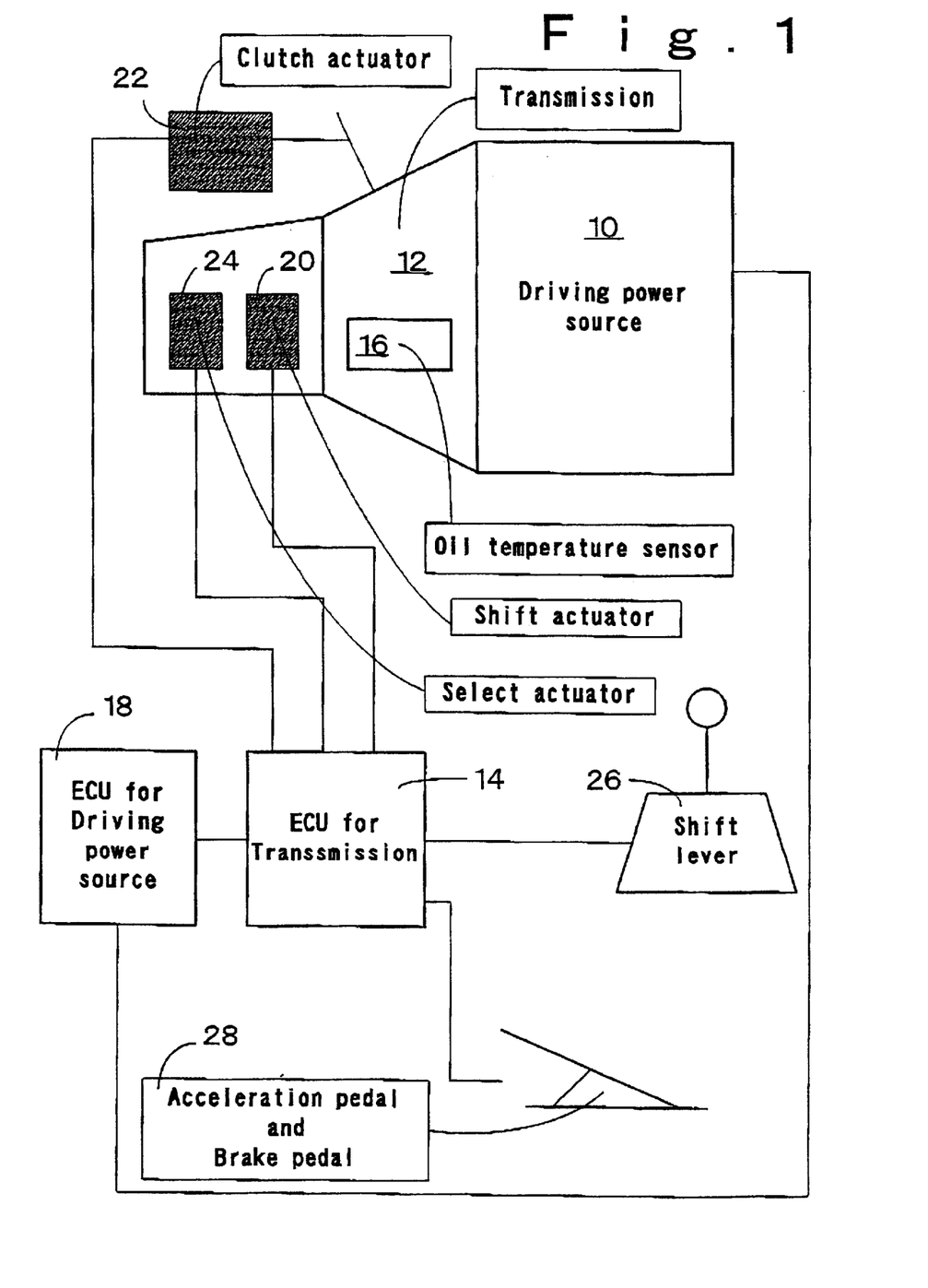
FIG. 1 is a schematic block view illustrating a transmission system, particularly an automatic manual transmission, according to an embodiment of the present invention.

Referring to the drawing figures, a further description of the present invention will now be set forth. FIG. 1 schematically illustrates the entire transmission system including an automatic manual transmission according to an embodiment of the present invention. The transmission system includes a driving power source (an engine or alternatively a driving motor) 10. The driving force from the driving power source 10 is transmitted to a synchromesh-type transmission (hereinafter referred to as a transmission) 12.

Figure 7:
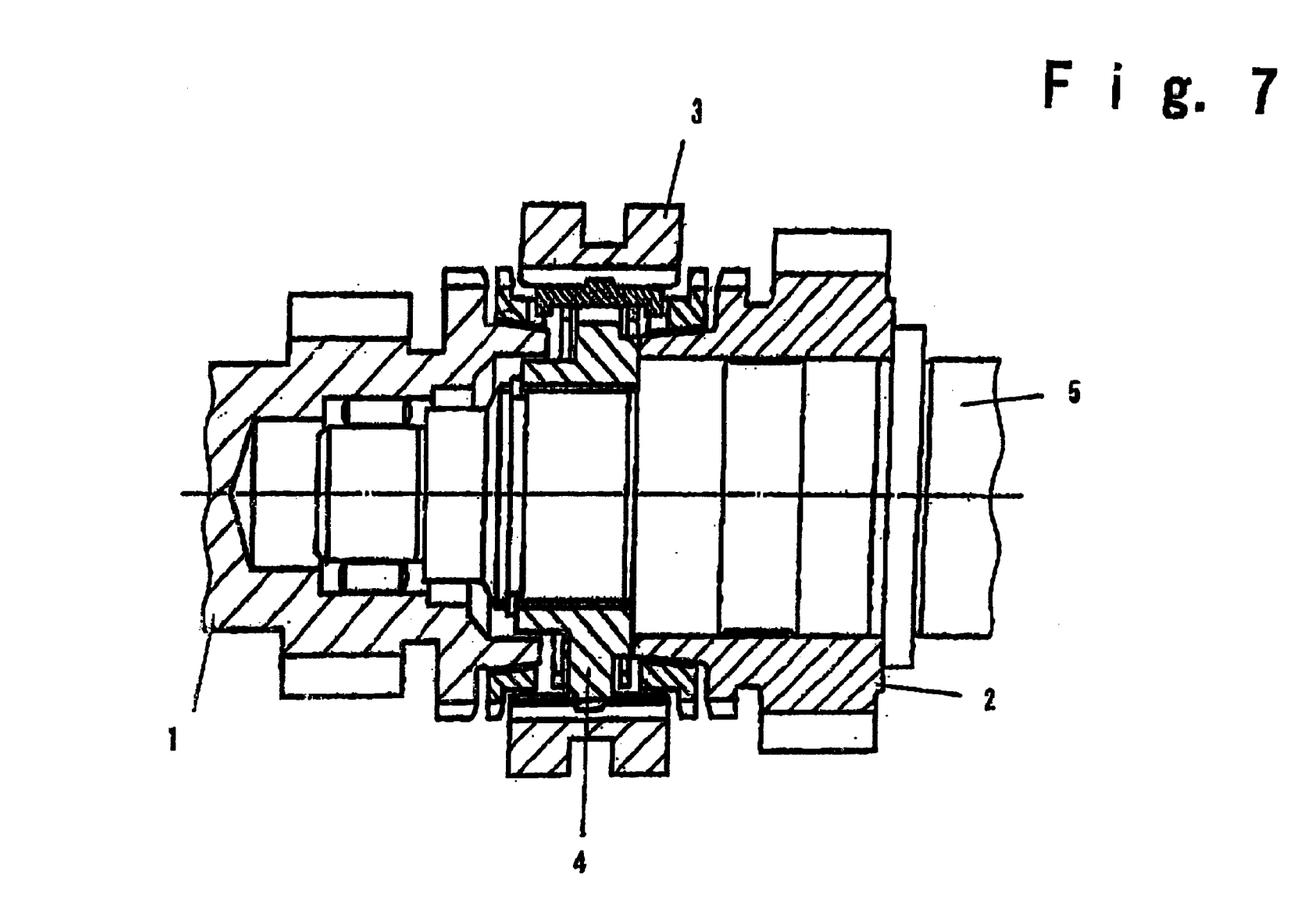
FIG. 7 is a cross-sectional view of a synchromesh-type transmission with which the actuator control device of the present invention can be used.

Generally speaking, the driving force from the driving power source 10 is transmitted to a clutch shaft disposed in the transmission, features of which are shown in FIG. 7, via a dry clutch for establishing or interrupting a driving force transmission. The driving force from the driving power source 10 is transmitted from the clutch shaft to a main shaft 5 via a main driving gear 1, a counter shaft, an idle gear 2, a sleeve 3 and a synchronizer hub 4, and then is outputted under a predetermined reduction gear ratio. This type of transmission further includes a clutch actuator 22 as shown in FIG. 1 for connecting/disconnecting the dry clutch, a select actuator 24 for selecting a sleeve in response to a speed-change gear, a shift actuator 20 for slidably moving a selected sleeve, and an electronic control unit (ECU) 14 for the transmission.

The ECU 14 for the transmission serves as a main part of the control device for the actuator and controls the actuator. The ECU 14 for the transmission receives an oil temperature input signal from an oil temperature sensor 16 which detects the oil temperature in the transmission, a speed-change indicating signal provided from a steering switch (not shown) or by an operation of a shift lever 26 by the driver, and respective pedal indicating signals indicating pedal depression from each of two pedal sensors (not shown) mounted on the acceleration pedal and the brake pedal 28.

The ECU 14 for the transmission and an ECU 18 for the driving power source are operated for a mutual exchange of outputs and inputs from a speed-change information signal and a driving power source information signal. Therefore, with the transmission system according to the described embodiment of the present invention, an automatic speed-change is performed on the basis of, for example, a vehicle speed and a throttle opening degree, and a manual speed-change is performed on the basis of the driver's intention.

The control of the shift actuator 20 by the ECU 14 for the transmission is as follows when the control device for the actuator detects a maximum electric current value supplied to the shift actuator. A maximum electric current value detecting means is included in the ECU 14 for the transmission. The maximum electric current value detecting means includes, as noted above, the determining unit, the electric current supplying unit, the detecting unit, the setting unit, and an output unit. Each of these units is connected to a microcomputer via an input interface or an output interface. The microcomputer includes a central processing unit CPU, a random access memory RAM, a read only memory ROM, and I/O ports.

Figure 2:
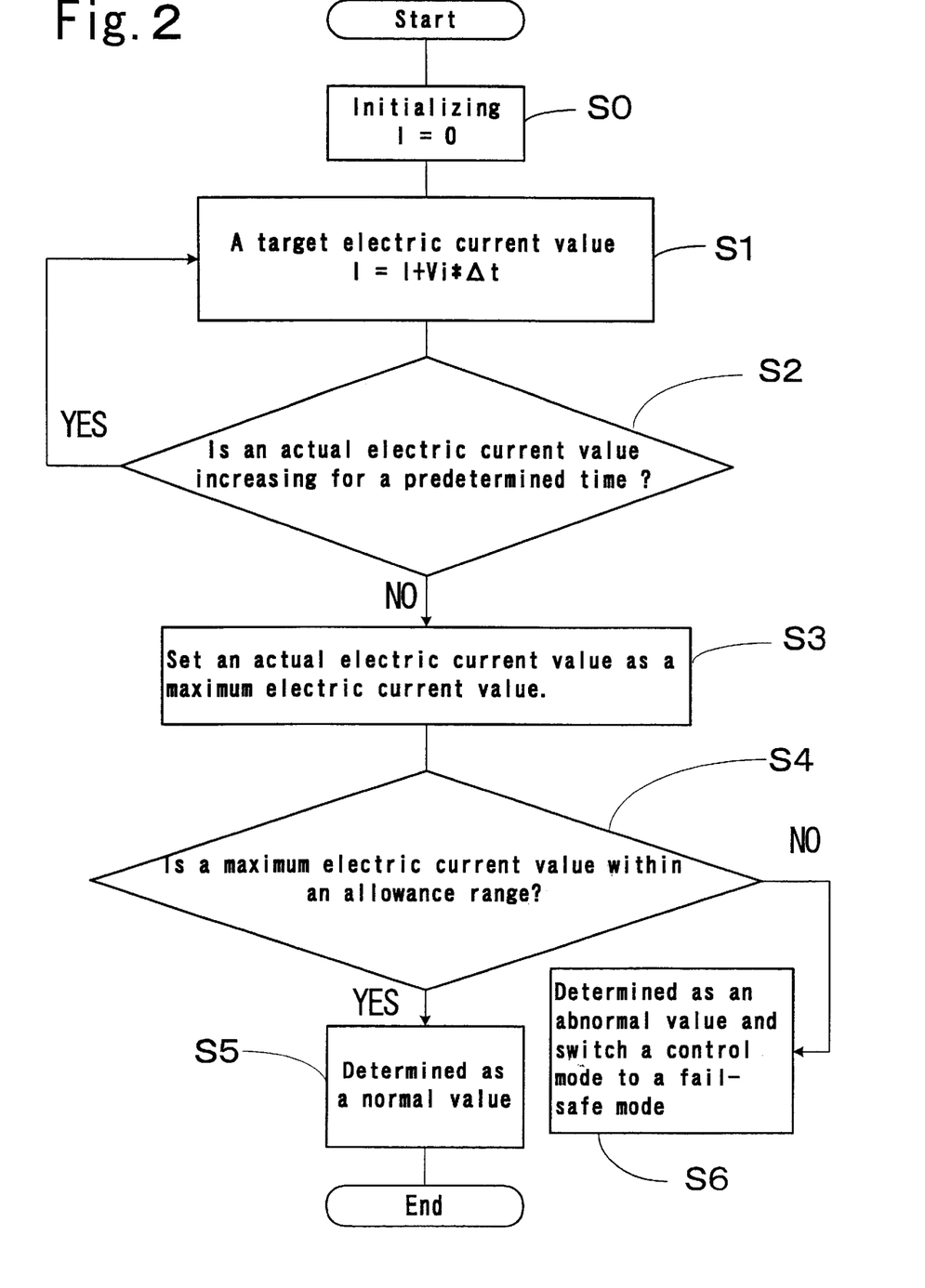
FIG. 2 is a flowchart illustrating the routine that is carried out by a maximum electric current value detecting device for detecting a maximum electric current value in accordance with the present invention.
Figure 3:
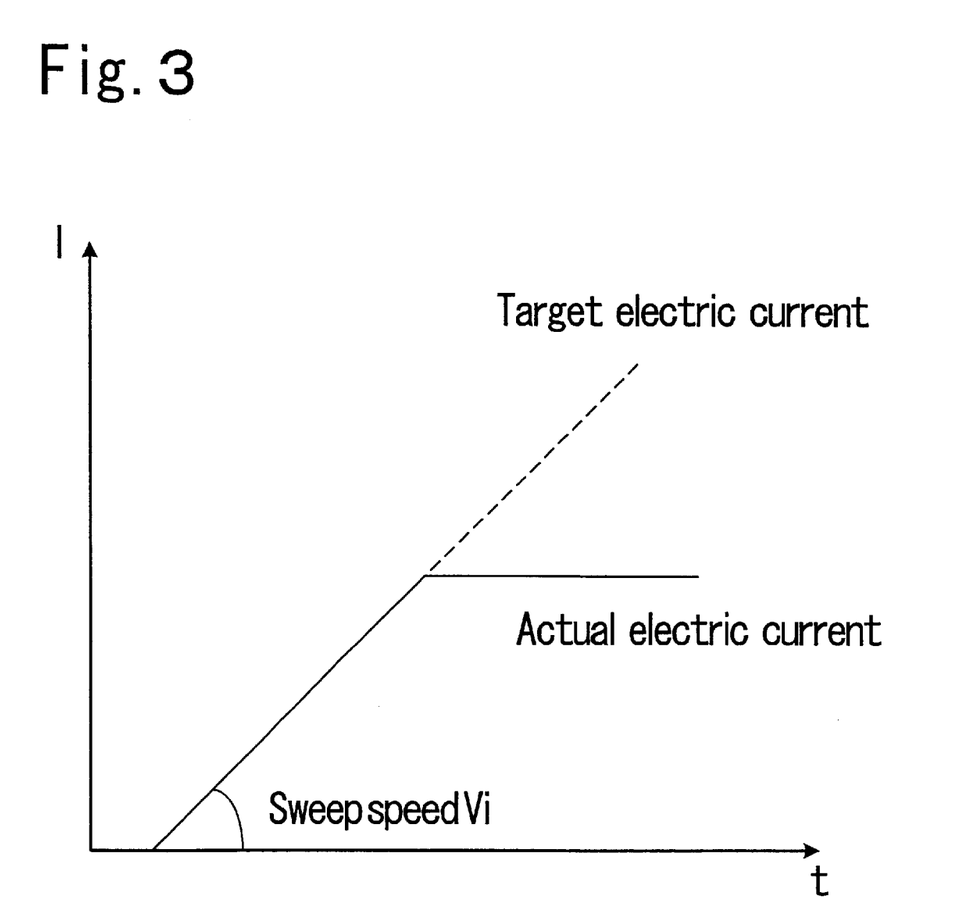
FIG. 3 is a graph illustrating a target electric current value determined by a determining unit in accordance with the present invention.

The flow chart illustrated in FIG. 2 shows a process carried out for detecting the maximum electric current value. In this described operation, the ECU 14 for the transmission performs the process shown in FIG. 2 immediately after an initial driving or operation of the ECU 14 and every time the oil temperature detected by the oil temperature sensor 16 increases or decreases by, for example, 20° C. At step S0, a target electric current value determined by the determining unit (e.g., the CPU) is initialized to be set at I=0. As shown in FIG. 3, the target electric current value I is increased proportionally corresponding to a time t (a time length Δt) with a constant sweep speed Vi. At step S1, the target electric current value I is transmitted to the electric current supplying unit (e.g., the output interface and the CPU). The electric current supplying unit outputs the electric current I to a DC motor serving as the shift actuator on the basis of the target electric current value determined by the determining unit.

Next, at step S2, the detecting unit (e.g., the input interface and the CPU) of the ECU 14 for the transmission judges if the actual electric current value is increasing for a predetermined time (e.g., Δt). If it is determined in step S2 that the actual electric current value is increasing, the program returns to step S1, wherein a larger electric current value (incremented by: Vi*Δt) is transmitted from the determining unit to the electric current supplying unit. On the other hand, when the actual electric current value is not increasing, the actual electric current value is detected as the maximum electric current value by the detecting unit and the program proceeds to step S3. Because a slight vibration may occur when the maximum electric current value is detected by the detecting unit, it is preferable that the actual electric current value is filtered and detected as the maximum electric current value.

At step S3, the maximum electric current value detected by the detecting unit is set (memorized) by the setting unit (e.g., the CPU and the RAM) of the ECU 14 for the transmission. The program then proceeds to the next step, step S4, wherein the output unit (e.g., the output interface and the CPU) of the ECU 14 for the transmission judges whether or not the maximum electric current value deviates from an allowable range. If the maximum electric current value is within the allowable range, the maximum electric current value is determined to be a normal value at step S5 and so the program is completed.

On the other hand, when it is determined in step S4 that the maximum electric current value deviates from the allowable range, the program proceeds to step S6. When the maximum electric current value deviates from the allowable range, it is regarded that a malfunction exists in the DC motor for instance. A malfunction indicating signal is thus outputted from the output unit and the control mode of the actuator is switched to a fail-safe mode. The program determines whether or not the maximum electric current value deviates from the allowable range based on a predetermined upper threshold value (e.g., 30A) and a predetermined lower threshold value (e.g., 0A).

Thus, with the actuator control device for a transmission in accordance with the present invention, once the maximum electric current value is detected by the detecting unit, the maximum electric current value is set and memorized by the setting unit. When electric current is supplied at the next step or time, the electric current is supplied to the actuator on the basis of the maximum electric current value set and memorized by the setting unit at the previous step or time. Thus, for example, referring to FIG. 6, assuming the detecting unit detects that the maximum electric current value actually supplied to the actuator is I2, during the next actuator cycle the maximum electric current value can be supplied to the actuator according to the illustrated dot-dash line in FIG. 6. In this way, surge load is not as likely to occur, thus reducing the likelihood of shift shock.

In accordance with the control device for the actuator applied in the transmission according to the described embodiment of the present invention, when the maximum electric current value is detected to be within the allowable range, the electric current supplied to the DC motor of the shift actuator is controlled in a proper manner, wherein the shift actuator is operated in a proper and stable manner. On the other hand, when the maximum electric current value detected by the detecting unit deviates from the allowable range, a malfunction of the DC motor is detected at an early stage, wherein preemptive action can be taken.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A control device for an actuator applied in a transmission, comprising:

target electric current value determining means for determining a target electric current value to be supplied to the actuator;

electric current supplying means for supplying an electric current to the actuator based on the target electric current value determined by the target electric current value determining means;

maximum electric current value detecting means for detecting a maximum electric current value actually supplied to the actuator regardless of the target electric current value determined by the target electric current value determining means; and maximum electric current value setting means for setting the maximum electric current value based on the maximum electric current value detected by the maximum electric current value detecting means.

2. The control device for an actuator applied in a transmission according to claim 1, wherein the target electric current value determining means for determining the target electric current value to be supplied to the actuator determines the target electric current value having a constant sweep speed.

3. The control device for an actuator applied in a transmission according to claim 1, wherein the transmission comprises a synchromesh-type transmission including an input shaft, an idle gear, an output shaft, and a synchromesh mechanism including a sleeve, the idle gear transmitting rotation of the input shaft and the sleeve transmitting rotation to the output shaft, with the synchromesh mechanism performing a predetermined speed-change by synchronizing the sleeve with the idle gear in response to movement of the sleeve, and the actuator including a shift actuator for moving the sleeve.

4. The control device for an actuator applied in a transmission according to claim 1, wherein:

the target electric current value determining means for determining the target electric current value includes a determining unit that determines the target electric current value to be supplied to the actuator;

the electric current supplying means for supplying the electric current to the actuator includes an electric current supplying unit that supplies the electric current to the actuator based on the target electric current value;

the maximum electric current value detecting means for detecting the maximum electric current value actually supplied to the actuator includes a detecting unit that detects the maximum electric current value actually supplied to the actuator regardless of the target electric current value; and the maximum electric value setting means for setting the maximum electric current value includes a setting unit that sets the maximum electric current value based on the maximum electric current value detected by the maximum electric current value detecting means.

5. The control device for an actuator applied in a transmission according to claim 4, wherein the determining unit that determines the target electric current value to be supplied to the actuator determines the target electric current value having a constant sweep speed.

6. The control device for an actuator applied in a transmission according to claim 1, including a malfunction indicating signal outputting means for outputting a malfunction indicating signal when the maximum electric current value set by the maximum electric current value setting means deviates from a predetermined allowable range.

7. The control device for an actuator applied in a transmission according to claim 6, including mode changing means for changing a control mode to a fail-safe mode when the malfunction indicating signal is outputted by the malfunction indicating signal outputting means.

8. The control device for an actuator applied in a transmission according to claim 6, wherein the malfunction indicating signal outputting means for outputting the malfunction indicating signal includes an output unit for outputting the malfunction indicating signal when the maximum electric current value set by the maximum electric current value setting means deviates from the predetermined allowable range.

9. The control device for an actuator applied in a transmission according to claim 8, including mode changing means for changing a control mode to a fail-safe mode when the malfunction indicating signal is outputted by the output unit.

10. The control device for an actuator applied in a transmission according to claim 1, wherein the maximum electric current value is detected by the maximum electric current value detecting means while the actuator is not activated.

11. The control device for an actuator applied in a transmission according to claim 10, wherein the actuator includes a hydraulic actuator driven by a solenoid valve.

12. The control device for an actuator applied in a transmission according to claim 10, wherein the actuator includes a DC motor.

13. The control device for an actuator applied in a transmission according to claim 12, including temperature detecting means for detecting an ambient temperature of the DC motor, the maximum electric current value detected by the maximum electric current value detecting means being based on the ambient temperature of the DC motor detected by the temperature detecting means.

14. The control device for an actuator applied in a transmission according to claim 13, wherein the temperature detecting means for detecting the ambient temperature of the DC motor includes a temperature detecting sensor that detects the ambient temperature of the DC motor.

15. The control device for an actuator applied in a transmission according to claim 13, wherein the transmission comprises a synchromesh-type transmission including an input shaft, an idle gear, an output shaft, and a synchromesh mechanism including a sleeve, the idle gear transmitting rotation of the input shaft and the sleeve transmitting rotation to the output shaft, with the synchromesh mechanism performing a predetermined speed-change by synchronizing the sleeve with the idle gear in response to movement of the sleeve, and the actuator including a shift actuator for moving the sleeve.

16. The control device for an actuator applied in a transmission for a vehicle according to claim 13, wherein the temperature detecting means for detecting the ambient temperature of the DC motor is adapted to estimate the ambient temperature of the DC motor based on at least one of the temperature of oil in the transmission, the temperature of oil in a driving motor, the temperature of oil in an engine of the vehicle, the temperature of cooling fluid in the transmission, the temperature of cooling fluid in the driving motor, the temperature of cooling fluid in the engine, and the temperature of an engine compartment of the vehicle.

17. The control device for an actuator applied in a transmission for a vehicle according to claim 13, including malfunction indicating signal outputting means for outputting a malfunction indicating signal when the maximum electric current value set by the maximum electric current value setting means deviates from a predetermined allowable range.

18. The control device for an actuator applied in a transmission for a vehicle according to claim 17, including mode changing means for changing a control mode to a fail-safe mode when the malfunction indicating signal is outputted by the malfunction indicating signal outputting means.

19. The control device for an actuator applied in a transmission for a vehicle according to claim 17, wherein the malfunction indicating signal outputting means for outputting the malfunction indicating signal includes an output unit that outputs the malfunction indicating signal when the maximum electric current value set by the maximum electric current value setting means deviates from the predetermined allowable range.

20. The control device for an actuator applied in a transmission for a vehicle according to claim 19, including mode changing means for changing a control mode to a fail-safe mode when the malfunction indicating signal is outputted by the output unit.

21. A control device for an actuator applied in a transmission, comprising:

target electric current value determining means for determining a target electric current value to be supplied to a motor of the actuator;

electric current supplying means for supplying an electric current to the actuator based on the target electric current value determined by the target electric current value determining means;

maximum electric current value detecting means for detecting a maximum electric current value actually supplied to the motor at least when the motor is inactive and regardless of the target electric current value determined by the target electric current value determining means; and maximum electric current value setting means for setting the maximum electric current value based on the maximum electric current value detected by the maximum electric current value detecting means.

* * * * *